United States Patent [19]

Sabatino et al.

[11] 4,075,399
[45] Feb. 21, 1978

[54] BATTERY VENT SEAL

[75] Inventors: Anthony Sabatino, St. Paul; Purushothama Rao, Burnsville, both of Minn.

[73] Assignee: Gould Inc., Rolling Meadows, Ill.

[21] Appl. No.: 583,672

[22] Filed: June 4, 1975

Related U.S. Application Data

[63] Continuation-in-part of Ser. No. 486,662, July 8, 1974, abandoned, which is a continuation-in-part of Ser. No. 377,563, July 9, 1973, Pat. No. 3,896,177.

[51] Int. Cl.$^2$ .......................................... H01M 2/12
[52] U.S. Cl. ................................................... 429/57
[58] Field of Search ................ 136/170, 177, 178; 429/57

[56] References Cited

U.S. PATENT DOCUMENTS

| 1,786,961 | 12/1930 | Petrosky | 136/177 |
| 1,816,035 | 7/1931 | Woodbridge | 136/177 |
| 2,835,720 | 5/1958 | Buskirk | 136/177 |
| 2,972,001 | 2/1961 | Clingenpeel | 136/177 |
| 3,284,244 | 11/1966 | Lucas | 136/177 |
| 3,466,199 | 9/1969 | Hennen | 136/177 |

Primary Examiner—John H. Mack
Assistant Examiner—H. A. Feeley
Attorney, Agent, or Firm—Leydig, Voit, Osann, Mayer & Holt, Ltd.

[57] ABSTRACT

A method of substantially sealing a lead-acid storage battery, capable of activation by the addition of electrolyte or water after storage, is provided which prevents excessive internal pressure build-up during the storage. In one embodiment, the substantial sealing is provided by a vent seal which can be formed with surfaces duplicating the diameter of the cell vent collar so that a conventional vent cap can be fitted and retained in place, substantially in the final operating position. When the substantial sealing is provided by means other than the vent seal, the seal, without the vent feature, serves to allow positioning of the normal battery vent caps in substantially their final operational positions. In the preferred embodiment, the vent seal includes a tear tab so that if accidentally replaced after removal and activation of the battery and partial separation of the tear tab, adequate venting of the gases generated within the battery such as would occur during charging is provided.

8 Claims, 12 Drawing Figures

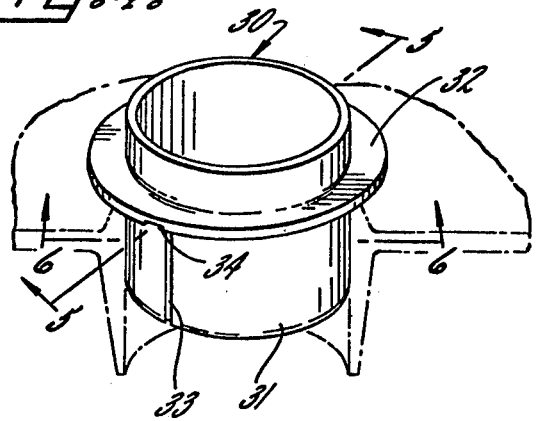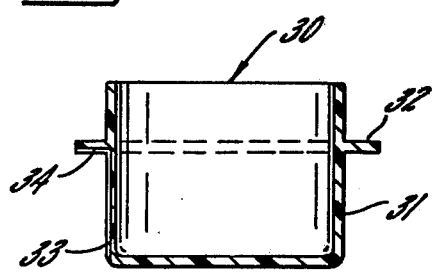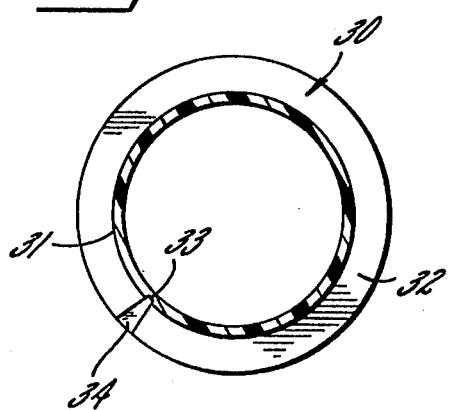

BATTERY VENT SEAL

RELATED APPLICATIONS

Sabatino and Rao, Ser. No. 486,662, filed July 8, 1974, for: Battery Vent Seal; the present application being a continuation-in-part of Ser. No. 486,662, now abandoned which is in turn a continuation-in-part of Ser. No. 377,563, filed July 9, 1973 now U.S. Pat. No. 3,896,177.

Mao and Sabatino, Ser. No. 486,663, filed July 8, 1974, now U.S. Pat. No. 3,948,680. for: Method of Making a Lead-Acid Storage Battery, and the Battery Itself, Capable of Activation by the Addition of Electrolyte, which is a continuation-in-part of Ser. No. 377,525, filed July 9, 1973, now abandoned.

Sabatino, Ser. No. 486,661, filed July 8, 1974 now abandoned, for: Water Activatable, Lead-Acid Storage Battery and Method for Manufacturing Same.

This invention relates generally to secondary batteries, and, more particularly, to a method for manufacturing, lead-acid storage batteries, capable of being stored and thereafter activated simply by the addition of electrolyte, or water, which are characterized by the absence of excessive internal pressure build-up during storage, to vented seals for such batteries, and to storage means for normal battery vent caps.

So-called dry charge, lead-acid batteries of either the water activatable type or the type which is activatable by addition of electrolyte are fairly well known. The latter type has become quite successful commercially; however, both types are important in the automotive-type battery market since batteries handled without electrolyte possess a number of commercial advantages. The cost of shipping such batteries is thus substantially less than "wet" batteries in which the electrolyte adds significantly to the weight of the battery. Also, shelf life is relatively long; and, accordingly, inventory control is facilitated.

The full advantages of the dry charge-type have, however, not been fully realized because of the difficulties and the expense associated with drying the water from the battery elements which is used to remove the electrolyte used in forming the elements. If this is not properly accomplished, it has been theorized that chemical and electrochemical reactions can take place which adversely affect the initial battery performance. Thus, for example, oxidation of the negative plates can occur so as to chemically discharge the plates, thereby adversely affecting the initial performance of the battery. Also, self-discharge can occur at the positive plates by reaction of the active components with the sulfuric acid electrolyte.

Accordingly, to insure that the batteries, after storage, will maintain a sufficient charge so as to meet acceptable initial performance requirements upon activation following storage, considerable effort has been directed towards the development of various techniques for completely drying the battery elements after the formation or charging. Thus, U.S. Pat. No. 2,880,529 uses a high velocity airstream. After drying, the battery elements are installed into battery containers, electrically connected and a cover bonded onto the container. U.S. Pat. No. 3,314,158 discloses installing the battery elements into the battery container and making the electrical connections prior to the formation, washing with water and drying steps. After the formation, a heated, non-oxidizing gas is impinged onto the top of the battery elements.

A more recent technique, not requiring completely drying, is shown in U.S. Pat. No. 3,652,341 wherein the battery elements are assembled into the container, the electrical connections made, the battery cells filled with a forming electrolyte and the battery elements then charged. About 70 to 97 weight percent of the forming acid is then removed by applying an accelerative force, such as centrifugal force to the battery.

While these techniques have achieved some success, the employment of such techniques adds to the manufacturing costs and lessens the economic benefits provided by dry charge batteries. Also, these techniques are not always successful in providing a dry charge-type battery which, after extended storage, will exhibit satisfactory performance after being activated. In addition, the complexity of these techniques could cause quality control problems.

The thrust of these prior patents is either that oxygen should not be utilized in contact with the formed plates or that, if it is utilized, the plates should be dried. It is further taught that the so-called dry charge batteries should be completely sealed.

However, if any significant amount of residual electrolyte remains in the sealed batteries, there can be some slight internal generation of gas, such as hydrogen, caused by the self-discharge of the negative active materials during extended storage, particularly when stored at elevated temperature. This gas generation can cause slight bulging of the containers, particularly when the batteries have thin-walled, plastic containers; and, in some cases, ejection of the vent seals may result. If this occurs and the vent seals are not timely replaced, massive self-discharge of the negative plates can result, thus rendering the battery unusable immediately upon addition of electrolyte and until such battery is fully recharged.

To prevent this undesirable gas build-up, it has been suggested to introduce a controlled amount of oxygen into the vent ports of the battery, prior to storage. Sealing means are thereafter placed over the battery container to prevent further ingress of air into the cell compartments. Air can be introduced either by permitting ambient air to diffuse into the cell or the process can be accelerated by forcing air into the cell compartments, either by blowing the air or by using compressed air. It is hypothesized that the introduction of air prevents the undesirable pressure build-up caused by the generation of hydrogen by providing sufficient oxygen initially to cause certain reactions to take place at the negative plate which neutralize the limited amount of sulfuric acid present to a degree so that the reaction of lead and sulfuric acid to generate hydrogen during subsequent storage is limited.

It is an object of the present invention to provide a method of making a lead-acid storage battery capable of being stored and thereafter activated by the addition of electrolyte or water in which excessive internal pressure buildup is prevented while maintaining, after activation, adequate initial battery performance characteristics.

A further object provides a vented seal for such batteries which prevents excessive internal pressure buildup that could otherwise result in permanent bulging of the container or ejection of the vent seals.

A still further object lies in the provision of a vented seal of the above character which gives the battery the visual appearance of a ready-to-go battery requiring no further processing.

Yet another object of this invention is to provide a vented seal as described herein which is economical to manufacture and use in the commercial production and marketing of automotive-type batteries.

Another object provides a means for holding the normal gang or individual vent caps in place during storage, transportation and display.

Still another object of this invention is to provide a vented seal as described herein which, after activation, can be replaced and thereafter allows adequate venting of the gases generated within the battery such as would occur during charging.

Other objects and advantages of the invention will become apparent upon reading the following detailed description and upon reference to the drawings, in which:

FIG. 4 is a perspective view of a further embodiment of a vented seal in accordance with the present invention;

FIG. 5 is a cross-sectional view taken substantially along lines 5—5 of FIG. 4;

FIG. 6 is a cross-sectional view taken substantially along lines 6—6 of FIG. 4;

Figure 1:
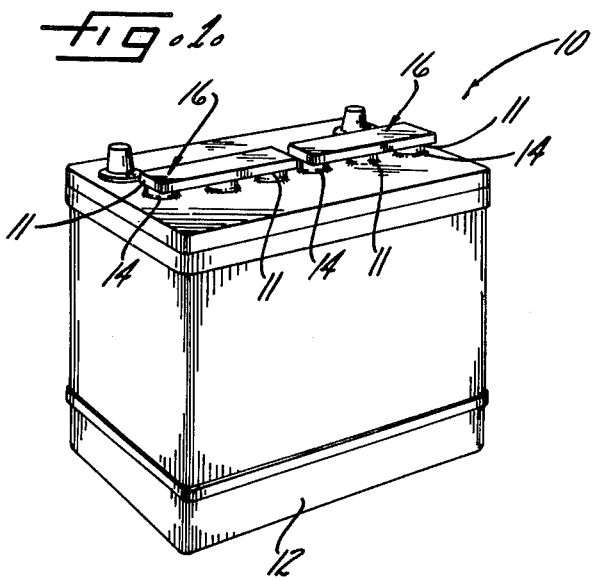
FIG. 1 is a perspective view of a battery embodying a seal according to one aspect of the present invention.

While the invention will be described in connection with certain embodiments, it will be understood that we do not intend to limit the invention to these embodiments. On the contrary, we intend to cover all alternatives, modifications and equivalents as may be included within the spirit and scope of the invention as defined in the appended claims.

Thus, while the disclosed embodiments show the use of certain means for achieving the substantial sealing of the vent openings, it should be appreciated that any other functionally similar means can be employed. For example, the cover and container may be sealed so as to obtain diffusion rates equivalent to the diffusion rates provided by the restricted sealing means as described herein. Further, a suitably sized venting channel could be molded into the surface of the vent boss of the cover, followed by sealing with a plug. Still further, appropriate substantial sealing could be achieved by the use of porous plastic films and wicks, etc. Yet another embodiment allowing suitable substantial sealing can be provided by molding a suitably sized hole in the cover for every cell. Still further, while the present invention will be principally described in connection with a dry charge-type battery capable of being activated after storage by the addition of electrolyte, it should be appreciated that the invention is equally applicable to water activatable batteries as are described in the Sabatino application, described previously, the disclosure of which is incorporated by reference.

In general, the present invention is predicated on the discovery that complete sealing of a dry charge-type battery during storage, to prevent the undesirable chemical and electrochemical reactions resulting in massive self-discharge of the negative plates, need not be effected. Thus, in accordance with this invention, the battery is provided with vent seals. In this fashion, undesirable excessive pressure build-up, caused by gas generation due to self-discharge reactions principally at the negative plates in storage, is relieved.

While the present invention can be advantageously employed with any type of dry charge-type battery, it is particularly useful in connection with the drain dry process for forming a dry charge-type battery described and claimed in the copending Mao and Sabatino applications identified herein. In this process, conditioning quantities of a treating agent affording certain metallic sulfates or which may react to afford such sulfates (e.g. — sodium sulfate or the like) is added to the formation electrolyte, a rinse electrolyte or to a separate solution in amounts of from about 0.05 to about 5.0 percent by weight of the solution or electrolyte. This addition obviates the necessity for removing, as by drying, all or substantially all of the electrolyte used to form the battery. Sufficient electrolyte is removed simply by draining, and the resulting battery can be stored for extended periods of time without significantly adversely affecting the performance of the activated battery. Depending upon the type and size of the battery, anywhere from about 15 to perhaps 60% of the electrolyte which is added during the overall formation and treatment process is retained in the battery during storage.

Figure 2:
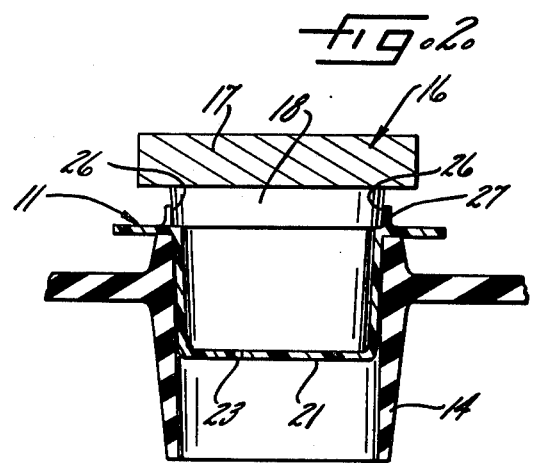
FIG. 2 is an enlarged fragmentary section of a portion of the battery shown in FIG. 1 including the vented seal.
Figure 3:
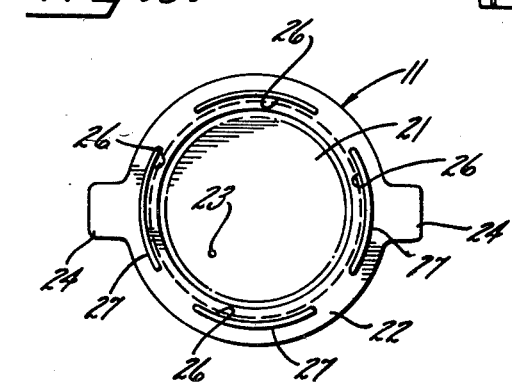
FIG. 3 is a plan or top view of the seal shown in FIG. 2.
Figure 7:
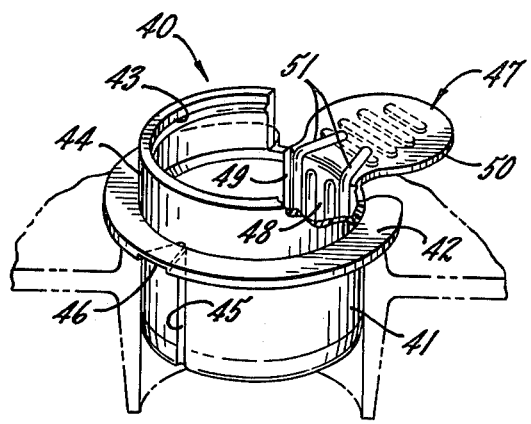
FIG. 7 is a perspective view of a still further embodiment of a vented seal in accordance with the present invention and showing a vented seal with a tear tab.
Figure 8:
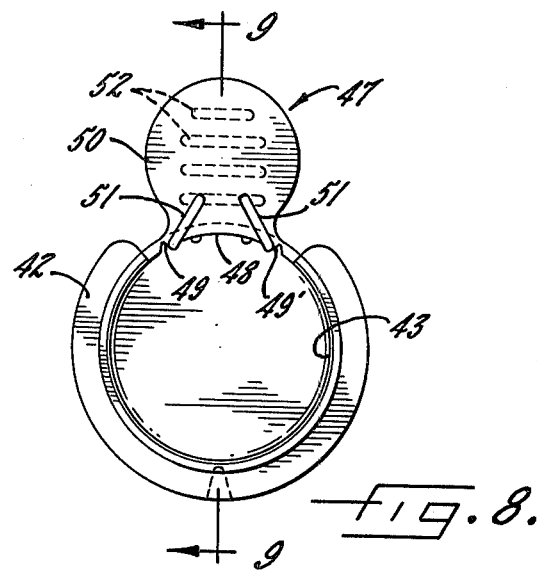
FIG. 8 is a plan or top view of the embodiment shown in FIG. 7.
Figure 9:
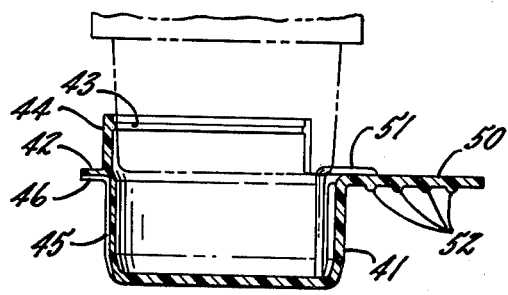
FIG. 9 is a cross-sectional view taken substantially along lines 9—9 of FIG. 8 and showing, in phantom, a vent cap in place.
Figure 11:
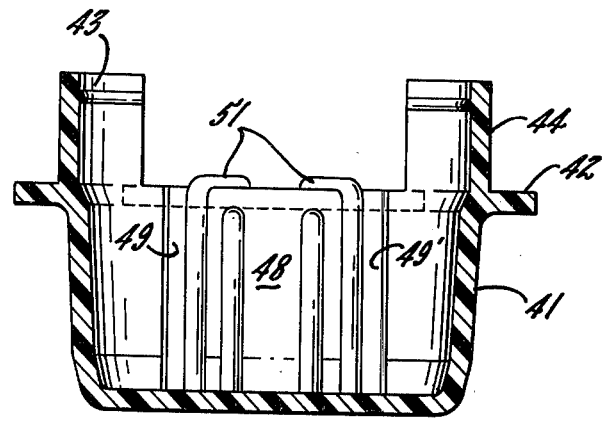
FIG. 11 is a cross-sectional view taken substantially along lines 11—11 of FIG. 10, and, FIG. 12 is a perspective view of the embodiment of FIG. 7 and showing the vented seal as the tear tab is pulled from the vent opening.
Figure 10:
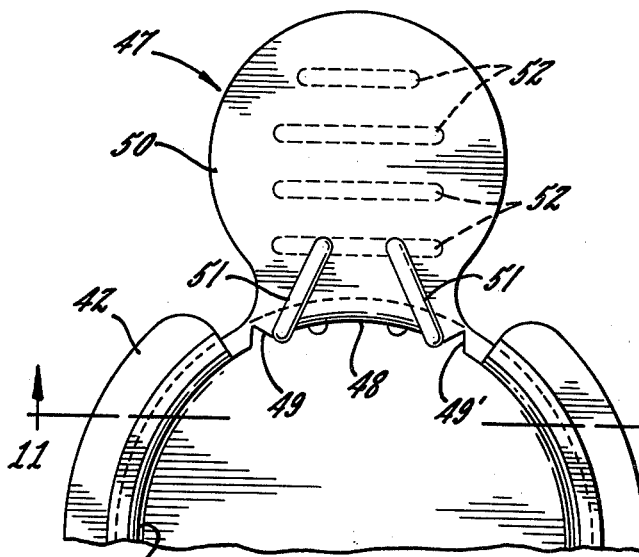
FIG. 10 is an enlarged fragmentary plan or top view of the embodiment shown in FIG. 7 and further illustrating the configuration of the tear tab.

Turning now to FIG. 1, there is shown a battery 10 having a plurality of seal assemblies 11 embodying the invention. As is conventional, the battery 10 includes a container 12 defining cells (including a number of positive and negative plates not shown) sealed by a cover 13 which has a plurality of substantially cylindrical collars 14 providing, respectively, an opening to each of the cells. In operational use, the collars 14 are closed by vent caps which, in the illustrated case, are a pair of ganged vent caps 16 each closing three collars and cells of the six-cell battery 10. The vent caps 16 have a main body 17 (FIG. 2) and a plurality of barrels 18 dimensioned to fit snugly within the collars 14. As is also conventional, the caps 16 are formed with internal labyrinth-like passages so that the cells can breathe, with gas flow through the collars 14, whereas electrolyte is prevented from splashing out. In modern commercial batteries, the gas passages through caps, such as the vent caps 16, are on the order of 0.125 to 0.400 of an inch in diameter.

Preferably, as has been referred to previously, the battery 10 is a drain-dry battery of the type, and produced by the process, disclosed and claimed in the herein identified Mao and Sabatino applications, or by the process disclosed and claimed in the herein identified Sabatino application. When in the drain-dry state, that is, when stored and awaiting active duty, the cells are substantially sealed by the vented seals 11, one being provided for each cell collar 14.

Pursuant to the present invention, the seals 11 are formed with a conical body 21, adapted to be sealingly wedged into a collar 14, a surrounding lip 22, which engages the top of the collar 14 when the body is pressed into place, and a small aperture 23 formed through the vent seal 11 for resisting gas flow but permitting gas, after a slight pressure build-up, to be vented from the cell. For most cells of the sizes used in automotive-type batteries, an aperture of about 0.0005 to 0.006 of an inch in cross section is satisfactory. The functional requirements for the sizing of the vent will be discussed in greater detail hereinafter. To facilitate removal of the seals 11 when it comes time to place the battery 10 into actual usage, the lips 22 are formed with opposing tabs 24 permitting the installer of the battery to conveniently get a grip on the seal, pull it from the collar and thereby open the underlying cell for the addition of water or electrolyte to activate the battery.

The internal pressure which is developed by the generation of gases such as hydrogen also resists air entering the small apertures 23 so that a little air may be admitted when the battery is in the storage, drain-dry state. However, the internal pressure is kept below that level which would cause permanent deformation of the case or container due to bulging or ejection of the vent caps since hydrogen or other gases can be forced out through the apertures.

Despite the small size of the apertures 23, there is, of course, some air, and hence oxygen, flow into the cells of the battery 10, particularly over a long storage period since the gas generation lessens with time due to the consumption of the residual sulfuric acid in the battery. This oxygen ingress need not be harmful; and, to the contrary, this slight oxygen influx to the cells as might be expected through the apertures 23 may provide beneficial results.

Thus, it is hypothesized that in a completely sealed dry charge-type battery negative plate sulfation (viz. — self-discharge) begins to lessen when all of the available oxygen within the battery is used up. This will tend to make more of the sulfuric acid available for the positive plates so that they will be thereby self-discharged. The positive plates will typically, it is believed, undergo considerably more self-discharge than the negative plates.

Accordingly, upon activation, the initial performance characteristics of the battery will be seriously limited by the heavily discharged positive plates. However, in accordance with the present invention, the influx of small, controlled amounts of oxygen may well tend to increase the extent of sulfation of the negative plates so as to make the initial battery performance less positive plate limited.

The size of the total venting aperture area in each vent seal should thus be sufficient to allow the internal gas build-up to be released without bulging of the container that would cause permanent deformation thereof or ejection of the vent seals resulting.

The actual total area of the vent opening, regardless of configuration, is thus principally dependent upon the rated capacity of the battery, as higher capacity batteries typically result in the generation of a proportionately greater volume of gases. The table set forth hereinafter may be used for assistance in selecting a vent seal for the listed battery sizes. It should however be appreciated that the nominal vent openings are merely illustrative and not in limitation of the present invention. The gas flow rates were measured through actual vent seals inserted into the battery cover vent openings by using calibrated flow meters. Any configuration of vent seal which provides, as a minimum, the measured flow rate for the listed battery size will provide the venting necessary to prevent gas pressure build-up sufficient to cause bulging of the container:

| Battery Size Rated Ah Capacity | Nominal Vent Opening Diameter Single Circular Aperture (in inches) | Measured Gas Flow Rate Through Vent Opening at 0.5 PSI and 75° F (in cc/min) |
|---|---|---|
| 40 – 93 | 0.001 – 0.002 | 2.0 – 6.0 |
| 94 – 300 | 0.002 – 0.004 | 6.0 – 9.0 |
| >300 | >0.004 | >9.0 |

The use of larger vent areas for batteries having relatively smaller capacities will be detrimental to battery shelf life. On the other hand, smaller diameter apertures, having diameters of 0.0005 inch or smaller, or openings having a gas flow rate equivalent thereto could also be used; however, commercially reproducing such embodiments is quite difficult.

While allowing an influx of a relatively large amount of air would tend to balance the rates of sulfation and discharge, allowing such increased amounts of oxygen to diffuse into the battery, in an amount which would be sufficient to equalize these rates, is undesirable. The initial battery performance characteristics would be adversely affected because of the extent of the forced initial self-discharge of the negative plates. The present invention thus provides an oxygen addition which makes the initial battery performance less positive plate limited yet does not increase the self-discharge at the negative plates to a level that would adversely affect the initial battery performance or significantly decrease the useful shelf life of the battery. As a further feature of this invention, the battery is given a more complete and ready-to-use appearance for shelf storage through mounting the vent caps 16 in substantially their final operational position by fitting the barrels 18 into retaining surfaces 26, formed by portions 27 of the seals extending from the lips 22 on the sides opposite the sealed bodies 21. The surfaces 26 overlie and substantially duplicate the internal dimensions of the collars 14 so that the vent cap barrels 18 fit snugly. Since the vent caps have their conventional venting passages, the apertures 23 and the seals 11 continue to control gas flow from the cells with the vent caps in place during battery storage.

Those skilled in the art will appreciate that the seals 11 can be easily and economically molded of any material which is resilient, acid resistant and otherwise provides the proper physical characteristics for this application. The apertures 23 can also be easily and economically punched into the seals.

By having the vent caps 16 substantially in their final operational positions, the battery 10 gives the appearance of a complete, finished product and minimizes the chance of having the normal vent caps misplaced or damaged as might be the case if they were separately packaged. Also, when used even without an aperture or the like allowing venting, the configuration of the seals described herein provides a ready storage location for the vent caps or gang vents, eliminating the nuisance typically resulting when the vent caps or gang vents must be separately packaged, taped to the battery, or the like.

Another embodiment of the vented seals of the present invention is shown in FIGS. 4 through 6. In this embodiment, the seals 30 are of an overall construction which is identical to the seals 11 of the previous embodiment discussed herein. Thus, the seals 30 are formed with a conical body 31, adapted to be sealingly wedged into a collar, and a surrounding lip 32 which engages the top of the collar when the body is pressed into place. In accordance with the present invention, the controlled venting is provided by a suitably sized groove or channel 33 molded into the side wall of the conical body 31 and communicating with the atmosphere via a tapered channel or groove 34 formed in the lip 32 of the seal. The total vent opening should preferably have a cross-sectional area and channel length which will provide gas venting or measured gas flow which is equivalent to that of a single aperture as previously discussed herein.

The controlled venting is achieved, in each of the illustrative embodiments, by the inclusion of a single aperture or channel. While this simplifies somewhat the manufacturing of the vented seals, this is unnecessary to achieve the functional advantages attendant with the use of this invention. Thus, for example, more than one aperture or channel could similarly be utilized by suitably sizing the multiple apertures or channels to provide the same or substantially the same area, and thus substantially the same gas egress and ingress as achieved by using a single aperture or channel. Still further, regardless of the geometric shape of the aperture, channel or whatever other means is used to effect the substantial sealing in accordance with this invention, the venting means should of course be fashioned to allow sufficient gas egress, and at the same time minimizing gas ingress to carry out the objectives of the present invention, i.e., to allow sufficient gas egress to prevent bulging sufficient to permanently deform the battery containers or eject the vent seals and preferably permit only a slight ingress of oxygen.

Also, while the illustrative embodiments include a continuously formed circular lip to engage the top of the vent collar, it should be appreciated that this is not required. Indeed, although desirable, a lip need not be provided. However, it is preferred to include at least a discontinuously or segmented lip having a surface sufficient to prevent the vented seal from being capable of being pushed all the way into the cell or so far into the vent opening that removal is difficult.

Likewise, although the retaining surfaces holding the normal vent caps are desirably continuous, this is unnecessary. All that is required is the provision of a means for retaining the normal vent cap in place, and this means may suitably comprise, for example, a number of upstanding prongs or the like.

When the battery is to be used, the vent caps and then the vented seals are removed; and the battery can thereafter be activated by the addition of electrolyte for dry charge-type batteries or water, in the case of water activated batteries. Conceptually, following activation, the vented seals should be discarded; and only the vent caps placed in position. However, should the vented seals be accidentally again placed in the battery cover vent opening prior to replacement of the vent caps, any subsequent substantial generation of gases within the battery, such as would occur if the battery were to be charged, could not be adequately vented to the atmosphere. Rupture of the battery container or the like could well result.

Accordingly, and pursuant to a preferred embodiment of the present invention, the vented seals are provided with a tear tab feature which obviates any potential problem in use. To this end, the vented seal if formed with a tear tab that is designed to cause the vented seal to at least partially rupture as the seal is being removed from the cover vent opening to allow activation of the battery.

As can be seen in the illustrative embodiment shown in FIGS. 7 through 12, the tear tab vented seal 40 has an overall construction generally identical to the seals 11 and 30 illustrated in FIGS. 1-3 and 4-6, respectively. The seal 40 is thus formed with a conical body 41, which is adapted to be sealingly wedged into the collar of the vent opening, and a surrounding lip 42, which engages the top of the collar when the body is pressed into place. As an optional and desired feature, and as was discussed in connection with the embodiment of FIG. 2, the battery is given a ready-to-use appearance by allowing the vent cap to be placed in the vented seals in substantially their final operational position. To this end, the seal 40 is provided with a retaining surface 43, formed by the portion 44 of the seal extending upwardly from the lip 42. The surface 43 overlies and substantially duplicates the internal dimensions of the collar so that a vent cap barrel will fit snugly therein.

The controlled venting is achieved by a suitably sized groove or channel 45 molded into the side wall of the conical body 41 and communicating with the atmosphere via a tapered channel or groove 46 formed in the seal lip 42.

In accordance with this preferred embodiment, a tear tab generally shown at 47 is provided which includes a main portion 48 integrally formed into the conical body 41 but at least partially separable therefrom, by rupturing means, such as the illustrated notches 49, 49' and a tab portion 50, suitably sized to be readily grasped by the thumb and a finger when it is desired to remove the vented seal. As shown, and to allow ready partial separation or rupture of the tear tab from the remainder of the vented seal, as well as to make it apparent that the tear tab must be used to remove the vented seal, the lip 42 and retaining surface 43 terminate adjacent the tear tab 47 and, desirably, as close as possible to the rupturing means. This serves to support the seal and to facilitate the partial separation of the tear tab from the remainder of the vented seal. The conical body of the vented seal has a slight taper relative to the vent collar so that the sealing is at least principally located at the upper portion of the conical body. The rupture thus need only accomplish a tear of about 1/16 of an inch, or perhaps less, to provide adequate gas venting during charging when such a vent seal is inadvertently reinserted into the battery vent opening.

Pursuant to a further and more specific aspect of this invention, the tear tab 47 is provided with a means so that a vertical force placed on the tear tab will be converted to a horizontal stripping force, functioning to facilitate separation of the vented seal 40. In the embodiment shown, this means comprises ribs 51 formed on the tear tab extending from the tab 50 to the main body 48. To make the tab more readily capable of being held without slipping when the vented seal is being removed, the tab may be provided with a surface roughening means such as the illustrative ribs 52.

Figure 12:
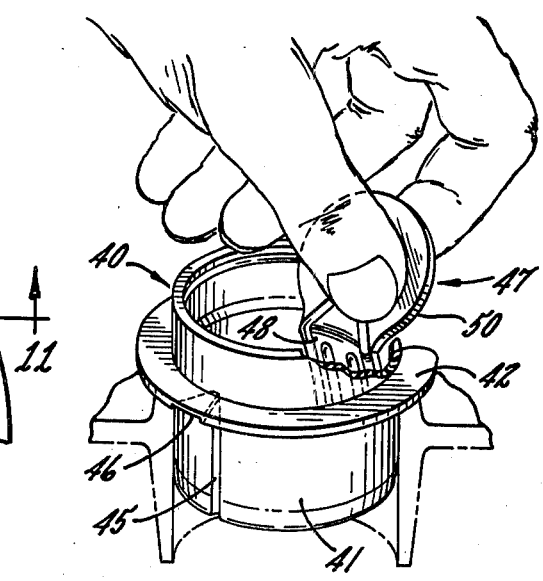

As best seen in FIG. 12, the manual removal of the vented seal, which is sealingly fit in the collar, by pulling on the tear tab will result in a partial separation of the tear tab. If the resulting self-destructed tear tab is reinserted into the vent opening after activation, adequate venting will be provided.

The controlled venting in the FIGS. 7-12 embodiment is provided by a suitably sized groove or channel. However, it should be appreciated that the tear tab feature can be used with any other venting means that achieves the controlled venting as discussed herein.

The present invention thus provides a method of substantially sealing a dry charge-type or water activatable battery which obviates any possible problems due to the excessive pressure build-up within the batteries during storage, and at the same time permits only a minimum quantity of air ingress into the battery. The venting seals, which achieve these objectives, may be readily manufactured and give the battery the visual appearance of a ready-to-go battery requiring no further processing. In addition, the seal configuration provides a ready storage means for the gang vents or vent caps. The inclusion of the self-destruct tear tab feature allows adequate venting even if, after activation by the addition of electrolyte, the destructed vented seal is inadvertently reinserted into the vent opening.

We claim as our invention:

1. For use with a lead acid battery having a cell and positive and negative plates containing formed active materials with a retained quantity of electrolyte and being closed except for a substantially cylindrical collar, a seal for relieving internal gas pressure while protecting the active materials from substantial oxidation, comprising a substantially cup-shaped member having a conical body adapted to be sealingly wedged into said collar, said member having a means communicating with the atmosphere and sized to allow, after a slight pressure build-up, venting of the gas from the battery sufficient to prevent bulging of the container that would cause permanent deformation thereof or ejection of the vent seal, said seal having a tear tab comprising a main portion integrally formed with said conical body, rupturing means defining said main portion and allowing said main portion to be partially separated from said conical body and a tab in-integrally formed with said main portion.

2. The seal of claim 1 wherein the cup-shaped member includes a lip surrounding said body for engaging the top of said collar when the body is sealingly pressed into the collar.

3. The seal of claim 2 wherein the means communicating with the atmosphere is a groove in the conical body and the lip of the cup-shaped member.

4. The seal of claim 2 wherein said tab and main portion include means converting a vertical force on said tab to a horizontal stripping force on said main portion.

5. The seal of claim 4 wherein said means comprises at least one rib extending from said rib to said main portion.

6. The seal of claim 2 wherein said lip includes portions on the side opposite said body defining a retaining surface having substantially the same internal dimensions as said collar, whereby a vent cap can be fitted into and retained by said surface in substantially the final operational position of said cap.

7. The seal of claim 6 wherein said lip and said retaining surface terminate adjacent said severing means.

8. For use with a lead acid battery having a cell and positive and negative plates containing formed active materials with a retained quantity of electrolyte and being closed except for a substantially cylindrical collar, a seal for relieving internal gas pressure while protecting the active materials from substantial oxidation, comprising a substantially cup-shaped member having a conical portion adapted to be sealingly wedged into said collar, a lip surrounding said portion for engaging the top of said collar when the portion is sealingly pressed into the collar, a cylindrical portion on the opposite side of said lip, said lip and conical portion having means communicating with the atmosphere and with each other and sized to allow, after a slight pressure build-up, venting of the gas from the battery, and said cylindrical portion defining a retaining means for holding a battery cap therein.

* * * * *

UNITED STATES PATENT OFFICE
CERTIFICATE OF CORRECTION

Patent No. 4,075,399   Dated February 21, 1978

Inventor(s) Anthony Sabatino et al.

It is certified that error appears in the above-identified patent and that said Letters Patent are hereby corrected as shown below:

On the Title Page, item [63], "Pat. No. 3,896,177" should read -- abandoned --. Column 1, line 9, "now U. S. Pat. No. 3,896,177" should read -- abandoned --.

Signed and Sealed this

Eighteenth Day of July 1978

[SEAL]

Attest:

RUTH C. MASON
Attesting Officer

DONALD W. BANNER
Commissioner of Patents and Trademarks